United States Patent
Ishida et al.

(10) Patent No.: US 9,428,238 B2
(45) Date of Patent: Aug. 30, 2016

(54) BODY FRAME STRUCTURE FOR SADDLE TYPE VEHICLE

(71) Applicant: HONDA MOTOR CO., LTD., Tokyo (JP)

(72) Inventors: Shinichiro Ishida, Wako (JP); Kota Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/474,921

(22) Filed: Sep. 2, 2014

(65) Prior Publication Data

US 2015/0068829 A1 Mar. 12, 2015

(30) Foreign Application Priority Data

Sep. 11, 2013 (JP) .................................. 2013-188826

(51) Int. Cl.
| | | |
|---|---|---|
| B62K 11/04 | (2006.01) | |
| B62K 19/04 | (2006.01) | |
| B62K 19/20 | (2006.01) | |

(52) U.S. Cl.
CPC ............... *B62K 11/04* (2013.01); *B62K 19/04* (2013.01); *B62K 19/20* (2013.01)

(58) Field of Classification Search
CPC ............................... B62K 11/04; B62K 11/02
USPC ......................................................... 180/219
See application file for complete search history.

(56) References Cited

U.S. PATENT DOCUMENTS

| | | | | |
|---|---|---|---|---|
| 3,508,765 | A * | 4/1970 | Stefan .................... | B62K 11/04 |
| | | | | 280/281.1 |
| 4,260,170 | A * | 4/1981 | Terai et al. ................... | 280/276 |
| 4,781,264 | A * | 11/1988 | Matsuzaki et al. ........... | 180/219 |
| 5,377,776 | A * | 1/1995 | Saiki ............................. | 180/219 |
| 5,921,339 | A * | 7/1999 | Matsuura ...................... | 180/219 |
| 5,984,336 | A * | 11/1999 | Hanafusa et al. ........... | 280/281.1 |
| 6,846,018 | B2 * | 1/2005 | Dennert et al. ............... | 280/785 |
| 7,004,276 | B2 * | 2/2006 | Iizuka et al. ............... | 180/89.17 |
| 7,320,378 | B2 * | 1/2008 | Inaoka et al. ................ | 180/225 |
| 7,360,619 | B2 * | 4/2008 | Adachi et al. ................ | 180/219 |
| 7,360,620 | B2 * | 4/2008 | Takenaka et al. ............ | 180/291 |
| 7,419,028 | B2 * | 9/2008 | Yamakura et al. ........... | 180/291 |
| 7,422,243 | B2 * | 9/2008 | Kudo et al. ................... | 280/834 |
| 7,694,985 | B2 * | 4/2010 | Hoshi ............................ | 280/274 |
| 7,699,132 | B2 * | 4/2010 | Adachi et al. ................ | 180/219 |
| 7,942,227 | B2 * | 5/2011 | Arnold .......................... | 180/231 |
| 7,971,672 | B2 * | 7/2011 | Kubo et al. ................... | 180/219 |
| 8,002,066 | B2 * | 8/2011 | Harada ......................... | 180/219 |

(Continued)

FOREIGN PATENT DOCUMENTS

JP 3539501 B2 7/2004

*Primary Examiner* — Anne Marie Boehler
*Assistant Examiner* — Michael Stabley
(74) *Attorney, Agent, or Firm* — Squire Patton Boggs (US) LLP

(57) ABSTRACT

A body frame structure for a saddle type vehicle includes a pair of left and right main frames extending rearward from a head pipe. A down frame extends downward from the head pipe, and a pair of left and right reinforcement members range between the main frame and the down frame. Each of the reinforcement members is formed in a roughly U-shaped form in sectional view, and ranges between the main frame and the down frame in the state where an opening portion of its roughly U-shaped sectional form is oriented inward in the vehicle width direction. Its end portions are welded respectively to the main frame and the down frame.

12 Claims, 4 Drawing Sheets

(56) References Cited

U.S. PATENT DOCUMENTS

| | | | |
|---|---|---|---|
| 8,091,673 B2 * | 1/2012 | Shinsho | 180/219 |
| 8,689,922 B2 * | 4/2014 | Kishikawa | 180/219 |
| 8,746,389 B2 * | 6/2014 | Oe et al. | 180/219 |
| 8,770,330 B2 * | 7/2014 | Inoue et al. | 180/68.4 |
| 2005/0126844 A1 * | 6/2005 | Ogura et al. | 180/311 |
| 2006/0065462 A1 * | 3/2006 | Ishida et al. | 180/227 |
| 2012/0161419 A1 * | 6/2012 | Iijima | 280/281.1 |

* cited by examiner

BODY FRAME STRUCTURE FOR SADDLE TYPE VEHICLE

BACKGROUND

1. Field

The present invention relates to a body frame structure for a saddle type vehicle.

2. Description of the Related Art

There have been known motorcycles provided with a body frame having a structure wherein a pair of left and right main frames extending rearward from a head pipe and a down frame extending downward from the head pipe are interconnected by reinforcement members (see, for example, Japanese Patent No. 3539501 (Patent Document 1)).

In the body frame having the structure as abovementioned, hollow pipe members are often used as the reinforcement members. In the case of using hollow pipe members as the reinforcement members, however, outer circumferential parts of both end portions of each reinforcement member must be welded, over the whole circumference, to the main frame and the down frame so that inner circumferential parts of the end portions are covered with the main frame or the down frame. This leads to a limitation imposed on the space around each reinforcement member due to the presence of the weld parts.

SUMMARY

In view of the foregoing, it is an object of the present invention to provide a body frame structure for a saddle type vehicle by which it is ensured that spaces around reinforcement members can be effectively utilized.

According to certain embodiments of the invention, there is provided a body frame structure for a saddle type vehicle. The body frame structure can include a pair of left and right main frames extending rearward from a head pipe, and a down frame extend downward from the head pipe. A pair of left and right reinforcement members are provided, ranging between the main frame and the down frame. Each of the reinforcement members is formed in a roughly U-shaped form in sectional view, and ranges between the main frame and the down frame in the state where an opening portion of the roughly U-shaped sectional form of the reinforcement member is oriented inward in a vehicle width direction (transverse direction). Each reinforcement member has its end portions welded respectively to the main frame and the down frame.

According to certain embodiments of the invention, at least one of an end portion that is welded to the main frame and an end portion that is welded to the down frame, of the reinforcement member, is welded to the main frame or the down frame in such a manner as to cover the main frame or the down frame from outside in the vehicle width direction.

According to certain embodiments of the invention, the reinforcement members extend forward from the main frames and are welded to the down frame. At least the end portion of the reinforcement member that is welded to the down frame is welded to the down frame in such a manner as to cover the down frame from outside in the vehicle width direction. An extension line of the extending direction of the reinforcement member extending from the end portion thereof is welded to the down frame is in the state of intersecting a lower end portion of the head pipe.

According to certain embodiments of the invention, the end portion of the reinforcement member that is welded to the main frame is welded, at least partly, to a sheet member welded to the main frame.

According to certain embodiments of the invention, an electrical unit is supported rearwardly of the head pipe. The reinforcement members are in the state of overlapping, at least partly, with the electrical unit in side view.

According to certain embodiments of the invention, an engine is disposed downwardly of the main frames, and a spark plug is provided at a cylinder portion of the engine. The reinforcement members are provided upwardly of the spark plug.

The opening portion of the roughly U-shaped sectional form of each reinforcement member is oriented inward in the vehicle width direction. This suppresses the protrusion, toward the inner side in the vehicle width direction, of the weld parts formed at the end portions of the reinforcement members which portions are welded to the main frames and the down frame, respectively. As a result, a wide space can be secured on the transversely inner side of each of the reinforcement members. In addition, inside regions of the reinforcement members can also be utilized effectively. This enables effective utilization of spaces around the reinforcement members.

In addition, by appropriately changing the lengths (in sectional view) of the opposed edge portions of the parts having the roughly U-shaped sectional form of the reinforcement members, it is possible to easily set the rigidity of the reinforcement members to a desired value. Therefore, the reinforcement members with a rigidity set as desired can be easily produced.

To be more specific, since roughly U-shaped in section, the reinforcement members can be formed easily and in large quantities by press molding or the like. Therefore, the reinforcement members with a desired rigidity can be formed easily and in large quantities, by performing press molding or the like after the lengths of the opposed edge portions of the parts having a roughly U-shaped sectional form of the reinforcement members are regulated and the lengths of the edge portions are determined so as to meet the rigidity requirements. On the other hand, in a configuration in which the main frames and the down frame are interconnected by pipe members, an adjustment of rigidity would need post-working, such as enlarging the pipe members in diameter, which takes a lot of time and effort.

In certain embodiments, each of the end portions of the reinforcement members roughly U-shaped in section is so located as to cover the main frame or the down frame from outside in the vehicle width direction. This ensures that a large weld area and an enhanced weld strength can be secured at each of the end portions of the reinforcement members. Besides, each of the reinforcement members is located more to the outer side in the vehicle width direction. This ensures that more space can be secured on the vehicle-width-directionally inner side of each reinforcement member. Consequently, the spaces around the reinforcement members can be utilized more efficiently and effectively.

In certain embodiments, the extension line of the extending direction of the reinforcement member extending from its end portion welded to the down frame is set intersecting a lower end portion of the head pipe. This setting ensures that, even in the case where the reinforcement member has such an inclination angle as to be nearly horizontal and is disposed near the head pipe, a large weld area and an enhanced weld strength can be secured at the end portion of the reinforcement member that is welded to the down frame.

Therefore, the reinforcement member can be maintained in a firmly fixed state. Besides, larger spaces can be secured on the lower side of the reinforcement members. Consequently, the spaces around the reinforcement members can be utilized more efficiently and effectively.

In certain embodiments, a desired torsional rigidity can be easily obtained by setting the sheet member to predetermined sizes while changing the roughly U-shaped sectional external form of the sheet member.

In certain embodiments, an electrical unit can be disposed, with ample margin, on the transversely inner side of the reinforcement members, and, simultaneously, tampering with the electrical unit can be prevented by the reinforcement members.

In certain embodiments, maintenance of the spark plug can be performed easily, without being hindered by the reinforcement members.

DETAILED DESCRIPTION

Figure 1:
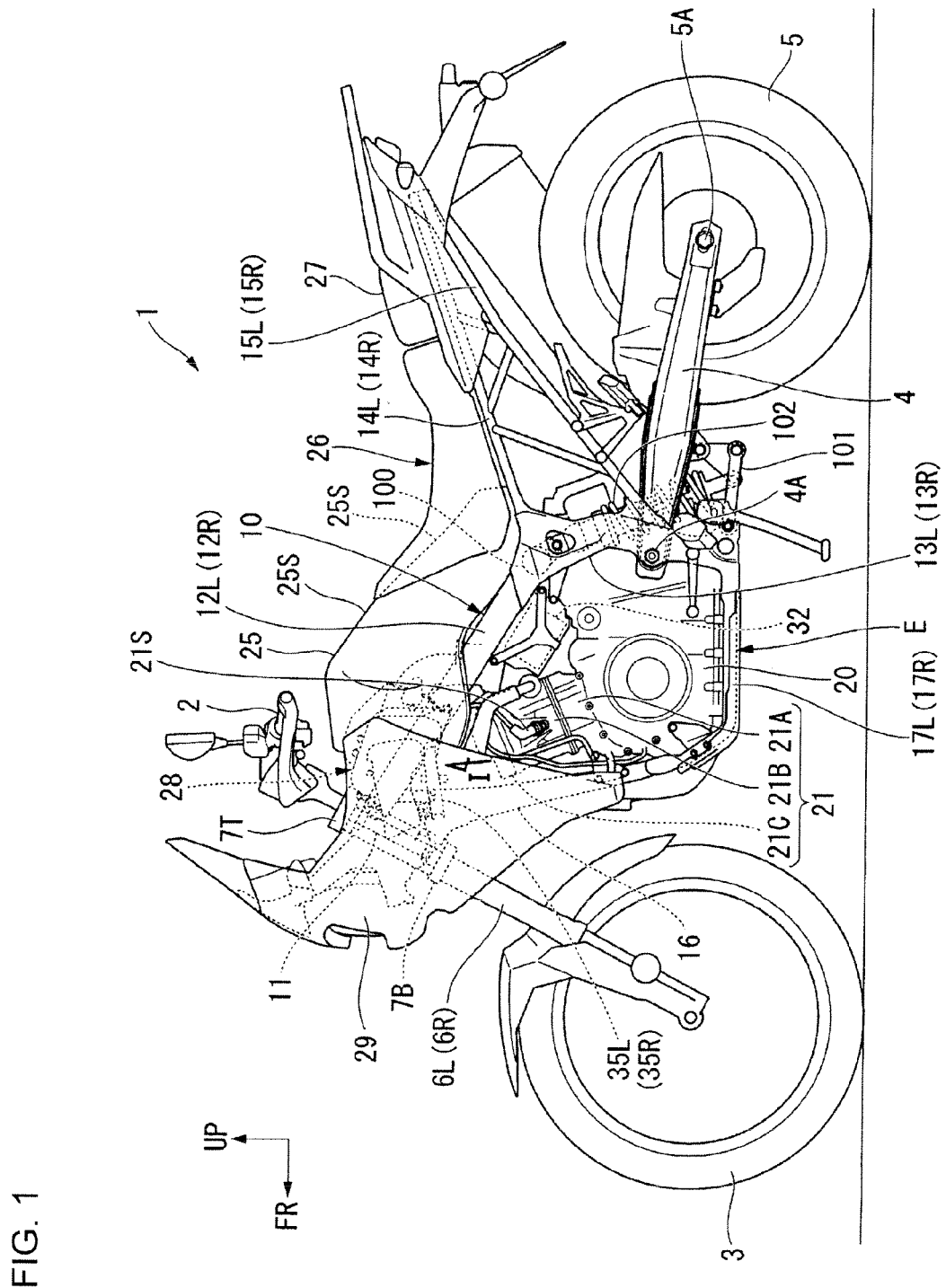
FIG. 1 is a left side view of a motorcycle provided with a body frame to which a structure according to an embodiment of the present invention has been applied.

Now, embodiments of the present invention will be described below, referring to the drawings. In the drawings used in the following description, arrow FR indicates the front side of the vehicle, arrow UP the upper side of the vehicle, and arrow LH the left-hand side of the vehicle.

FIG. 1 shows a left side view of a motorcycle 1 as a saddle type vehicle provided with a body frame 10 to which a body frame structure according to the present embodiment has been applied. In the motorcycle 1, an engine E is disposed between a front wheel 3 which is steered by a steering handlebar 2, and a rear wheel 5 which is disposed at a rear end portion of a swing arm 4. Steering system components including the steering handlebar 2 and the front wheel 3 are supported on a head pipe 11 at the front end of the body frame 10 in a steerable manner. The swing arm 4 is swingably supported on the body frame 10 at its front end portion, and supports an axle 5A of the rear wheel 5 by its rear end portion.

The body frame 10 is configured by uniting a plurality of frame members by welding or the like. The body frame 10 includes the head pipe 11, a pair of left and right main frames 12L and 12R branching from the head pipe 11 to the left and right sides and extending rearwardly downward, and a pair of left and right pivot plates 13L and 13R connected respectively to rear end portions of the left and right main frames 12L and 12R and extending downward. A pair of left and right seat rails 14L and 14R are connected respectively to upper portions of the left and right pivot plates 13L and 13R and extending rearwardly upward. A pair of left and right sub frames 15L and 15R are connected respectively to the left and right pivot plates 13L and 13R on the lower side of the left and right seat rails 14L and 14R, extend rearwardly upward, and are connected to the corresponding left and right seat rails 14L and 14R at their rear end portions.

The body frame 10 can include a single down frame 16 extending rearward and downward from the head pipe 11 at a steeper angle as compared with the main frames 12L and 12R. A pair of left and right lower frames 17L and 17R branch from a lower end portion of the down frame 16 to the left and right sides, extend rearward, and are connected at their rear end portions to lower end portions of the corresponding left and right pivot plates 13L and 13R. The main frames 12L and 12R, the seat rails 14L and 14R, and the pivot plates 13L and 13R are interconnected so as to be Y-shaped as a whole, in side view of the body frame 10.

Figure 2:
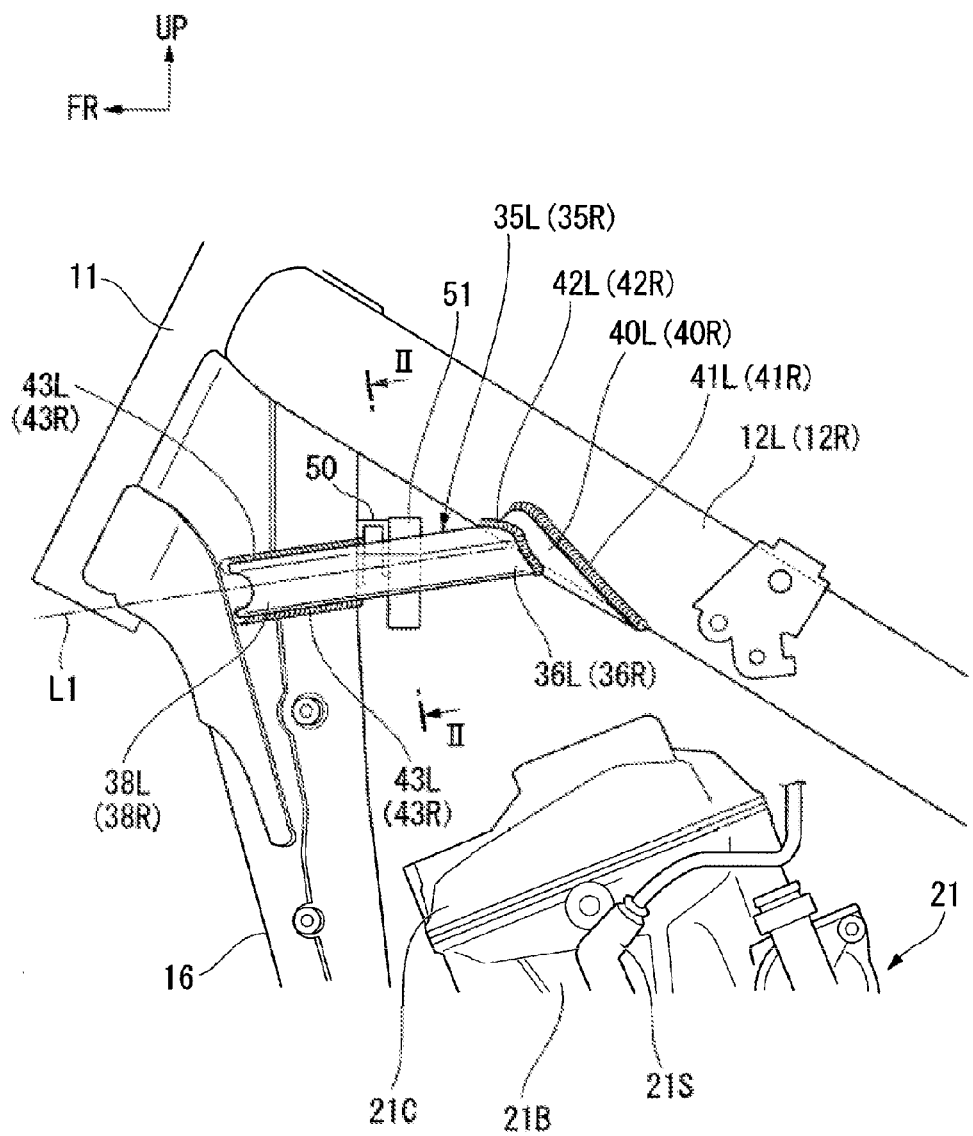
FIG. 2 is a left side view of a front portion of the body frame.

In FIG. 1, those members which do not appear in the figure are denoted by parenthesized symbols for convenience of description. In FIG. 2 and so on, also, those members which do not appear in the drawing may be denoted by parenthesized symbols for convenience of description.

The body frame 10 is configured as a semi-double cradle type body frame wherein the engine E is disposed downwardly of the main frames 12L and 12R and forwardly of the pivot plates 13L and 13R, and the engine E is surrounded on the front and lower sides thereof by the down frame 16 and the lower frames 17L and 17R. The engine E is supported on the body frame 10 through a plurality of engine support portions provided in appropriate locations.

It is to be noted that, of the pair of left and right main frames 12L and 12R, the pair of left and right pivot plates 13L and 13R, the pair of left and right seat rails 14L and 14R, the pair of left and right sub frames 15L and 15R, and the pair of left and right lower frames 17L and 17R, the left-hand ones are arranged on the left side with reference to the width-directional center of the vehicle, while the right-hand ones are arranged on the right side with reference to the width-directional center of the vehicle. The left-hand and right-hand ones in each pair of left and right frame components are coupled together by a cross frame or cross frames (omitted in the drawings) at an appropriate position or positions.

The engine E includes: a crankcase 20 in which a crankshaft and a transmission are integrally housed; and a cylinder assembly 21 projecting upward or forwardly upward from an upper surface front side of the crankcase 20. The crankcase 20 and the cylinder assembly 21 are coupled to each other to be V-shaped as a whole in side view.

The engine E is so disposed that the crankcase 20 and the cylinder assembly 21 are well contained in a space that is surrounded by the main frames 12L and 12R, the pivot plates 13L and 13R, the down frame 16, and the lower frames 17L and 17R.

The cylinder assembly 21 has its cylinder axis direction (erect arrangement direction) set substantially along the direction in which the down frame 16 extends. The engine E can be a transversely mounted in-line multi-cylinder (e.g., two-cylinder) engine, in which a plurality of cylinders are arranged side-by-side in the left-right direction in the cylinder assembly 21. It is to be noted, however, that the engine E may also be a single-cylinder engine, a V-type multi-cylinder engine or the like.

In certain embodiments, the cylinder assembly 21 can include a cylinder block 21A connected to a front upper portion of the crankcase 20 and projecting forwardly upward. A cylinder head 21B can be connected to an upper portion of the cylinder block 21A, and a head cover 21C covering an upper portion of the cylinder head 21B from above. A spark plug 21S is provided at a left side wall of the cylinder head 21B, and a harness therefor is led out upward.

The steering system components supported on the head pipe 11 can include the front wheel 3, and a pair of left and right front forks 6L and 6R which support the front wheel 3 on their lower portions. A top bridge 7T is provided ranging between upper end portions of the front forks 6L and 6R, and a bottom bridge 7B is provided ranging between the front forks 6L and 6R downwardly of the top bridge 7T. A steering shaft (not shown) is provided ranging between the top bridge 7T and the bottom bridge 7B, and rotatably supported by being passed through the head pipe 11. The steering handlebar 2 disposed on the side of an upper portion of the steering shaft.

The swing arm 4 is connected to the pair of left and right pivot plates 13L and 13R of the body frame 10, by a pivot shaft 4A provided at vertically roughly central parts of the pivot plates 13L and 13R. The pivot shaft 4A is provided ranging between the pair of left and right pivot plates 13L and 13R. Thus, the swing arm 4 is vertically swingable about an axis extending in the left-right direction.

Here, a cross frame 100 is spanningly provided between upper portions of the pivot plates 13L and 13R. A link member 101 is provided ranging between a longitudinal-vehicle-directionally roughly central part of a lower portion of the swing arm 4 and lower portions of the pivot plates 13L and 13R. In addition, a rear cushion 102 is provided ranging between the link member 101 and the cross frame 100.

A fuel tank 25 is supported on the main frames 12L and 12R. On the rear side of the fuel tank 25, a driver's seat 26 is supported on front upper portions of the seat rails 14L and 14R, and a passenger's seat 27 is supported on rear upper portions of the seat rails 14L and 14R. Seating portions of the driver's seat 26 and the passenger's seat 27 extend along the seat rails 14L and 14R.

The fuel tank 25 extends rearwardly downward from a position which is rearwardly of the head pipe 11 and downwardly of the steering handlebar 2. In this case, the fuel tank 25 extends on the upper side of the main frames 12L and 12R along the main frames 12L and 12R, to reach a position upwardly of the pivot plates 13L and 13R. An upper surface 25S of the fuel tank 25 is inclined to slope down along a rearward direction, and extends substantially along the main frames 12L and 12R.

An air cleaner 28 is disposed upwardly of the cylinder assembly 21 of the engine E, between the head pipe 11 and the fuel tank 25. The fuel tank 25 is formed at its front portion with a recess (omitted in the drawing) forming a hollow rearward. A part of the air cleaner 28 is contained in the recess.

Around the head pipe 11, there is provided a front cowl 29 extending to spread over the front side of the head pipe 11 and the left and right sides (vehicle-width-directionally outer sides) of the head pipe 11, so as to cover the head pipe 11 on the front side and on the left and right sides of the head pipe 11. The front cowl 29 covers a front portion of the fuel tank 25 on the left and right sides of the fuel tank 25, and covers the air cleaner 28 on the left and right sides of the air cleaner 28.

The front cowl 29 is supported on the vehicle body side, by a structure in which an inner wall of the front cowl 29 is fixed to a front cowl stay disposed forwardly of the head pipe 11.

A space opening to the vehicle-width-directionally outer sides is formed on the inside of all of the cylinder assembly 21, the main frames 12L and 12R, the pivot plates 13L and 13R, and the crankcase 20, in side view. In this space, a battery 32 having an outside appearance in a rectangular parallelepiped shape is disposed.

Figure 3:
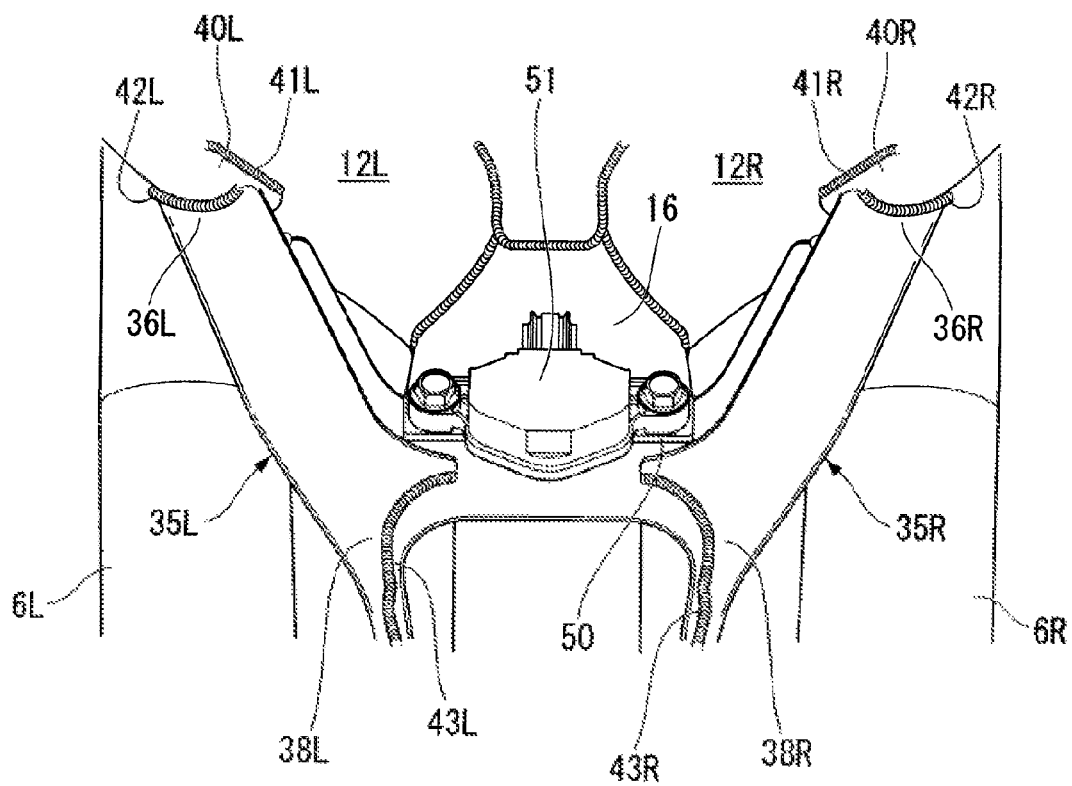
FIG. 3 is a view along arrow I in FIG. 1, of a front portion of the body frame.
Figure 4:
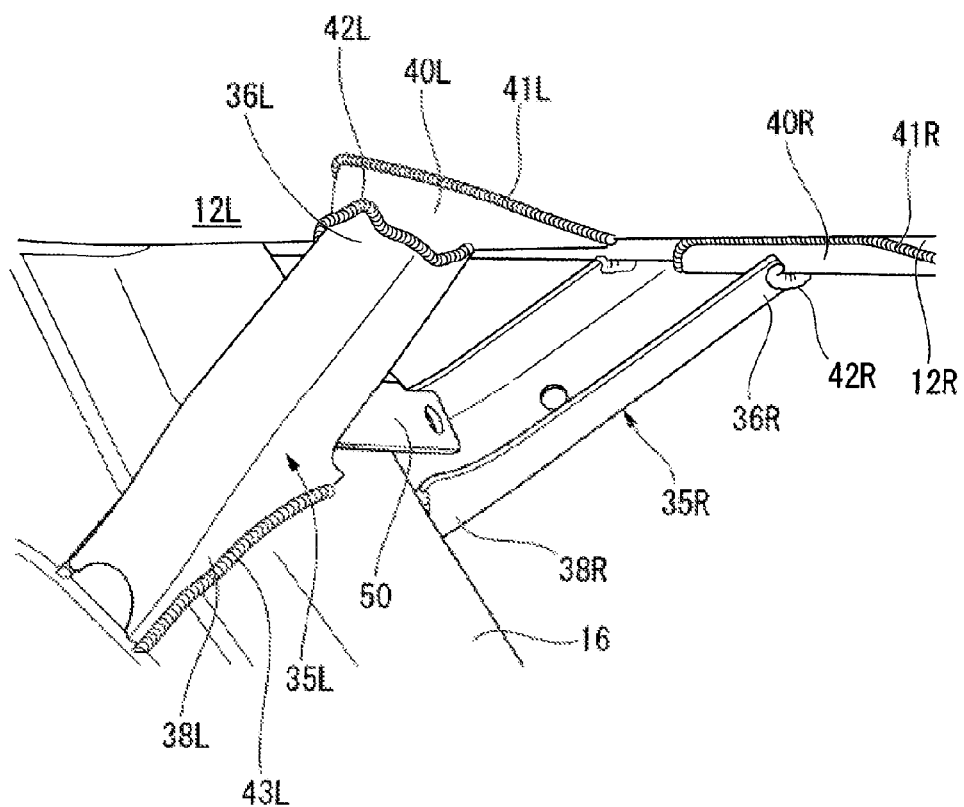
FIG. 4 is a perspective view, as viewed obliquely from a left rear side, of a front portion of the body frame.

FIGS. 2 to 4 show a front portion of the body frame 10 according to certain embodiments. A pair of left and right reinforcement members 35L and 35R are provided each ranging between a front portion of the main frame 12L or 12R and an upper portion of the down frame 16. The reinforcement members 35L and 35R are formed by press molding of a metallic sheet.

Figure 5:
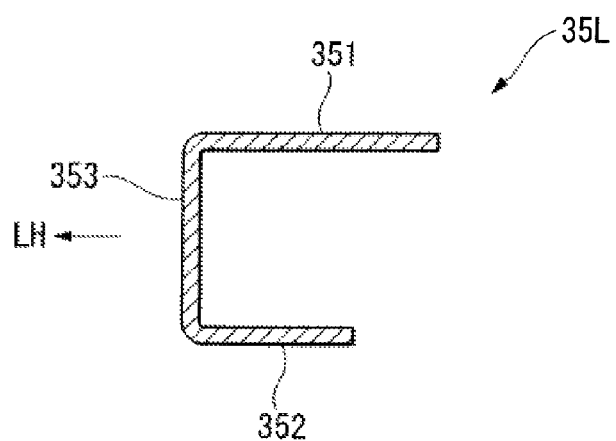
FIG. 5 is a sectional view taken along line II-II in FIG. 2.

As shown in FIG. 5, the reinforcement members 35L and 35R are each roughly U-shaped in sectional view. As shown in FIG. 2, each of the reinforcement members 35L and 35R extends from the main frame 12L or 12R toward the down frame 16 along a forward direction (in this example, along a forwardly downward direction) in side view. Referring to FIG. 1, the reinforcement members 35L and 35R are located above the head cover 21C of the engine E. In addition, each of the reinforcement members 35L and 35R ranges between the main frame 12L or 12R and the down frame 16, in a state where the opening portion of the roughly U-shaped sectional form thereof is oriented inward in the vehicle width direction. Each of the reinforcement members 35L and 35R is welded to the main frame 12L or 12R and to the down frame 16, at end portions thereof.

In certain embodiments, those end portions 36L and 36R of the reinforcement members 35L and 35R which are welded respectively to the main frames 12L and 12R are connected respectively to the main frames 12L and 12R, by being welded to sheet members 40L and 40R welded in part to the main frames 12L and 12R, respectively.

More specifically, the sheet members 40L and 40R are welded to the main frames 12L and 12R, by a configuration wherein the sheet members 40L and 40R make contact with surface areas, ranging from lower surfaces to side surfaces oriented outward in the vehicle width direction, of the main frames 12L and 12R and wherein beads 41L and 41R formed at outer circumferential edge portions of the sheet members 40L and 40R range to the main frames 12L and 12R.

The end portions 36L and 36R are welded to the sheet members 40L and 40R and the main frames 12L and 12R, by a configuration wherein beads 42L and 42R formed at outer circumferential edge portions of end surfaces of the end portions 36L and 36R, in a state where rear-side parts of the end surfaces are in contact with the sheet members 40L and 40R and where the front-side remaining parts of the end surfaces are in direct contact with the main frames 12L and 12R, range to both the sheet members 40L and 40R and the main frames 12L and 12R.

In certain embodiments, the main frames 12L and 12R are each formed in a roughly elliptic shape elongated in the vertical direction. The end surfaces of the end portions 36L and 36R are each formed in an arcuate shape so as to make contact with both the sheet member 40L or 40R and a surface area, ranging from a lower surface to a side surface oriented outward in the vehicle width direction, of the main frame 12L or 12R. Therefore, the end portions 36L and 36R are welded to the main frames 12L and 12R in such a manner as to cover the main frames 12L and 12R on the vehicle-width-directionally outer sides of the latter.

On the other hand, those end portions 38L and 38R of the reinforcement members 35L and 35R which are welded to the down frame 16 are welded directly to the down frame 16 in such a fashion as to cover an upper portion of the down frame 16 on the vehicle-width-directionally outer sides of the latter.

In certain embodiments, the down frame 16 is formed in a roughly rectangular shape in sectional view. End surfaces of the end portions 38L and 38R are each formed roughly in L shape so as to make contact with a surface area, ranging from a surface oriented rearward to a side surface oriented outward in the vehicle width direction, of the down frame 16. The end portions 38L and 38R are welded to the down frame 16, by a configuration wherein beads 43L and 43R formed at outer circumferential edge portions of the end surfaces thereof range to the down frame 16.

Here, a straight line denoted by symbol L1 in FIG. 2 is a straight line along the extending direction of the reinforcement member 35L (35R), or an extension line of the extending direction of the reinforcement member 35L (35R) extending from the end portion 38L (38R) of the reinforcement member 35L (35R). As is clear from the straight line L1, the reinforcement member 35L (35R) extends in the state of substantially orthogonally intersecting the down frame 16 (the extending direction of the down frame 16) in side view. The bead 43L (43R) is formed at only an edge part, extending in the extending direction of the reinforcement member 35L (35R), of the outer circumferential edge portion of the end surface of the end portion 38L (38R).

In addition, as is clear from the straight line L1, the extension line of the extending direction of the reinforcement member 35L (35R) extending from the end portion 38L (38R) of the reinforcement member 35L (35R) is intersecting a lower end portion of the head pipe 11.

A sensor support stay 50 is welded to a rearwardly oriented surface of an upper portion of the down frame 16, on the rear side of the head pipe 11. An inclination sensor 51 is supported on the sensor support stay 50 by bolting. Here, as shown in FIG. 2, the reinforcement members 35L and 35R are overlapping, at least in part, with the inclination sensor 51 in side view.

Referring to FIG. 5 again, the reinforcement member 35L includes a pair of opposed edge portions 351 and 352 and a link portion 353 linking the edge portions 351 and 352, whereby a roughly U-shaped sectional form is assumed as a whole. The edge portion 351 located on the upper side and extending along the straight line L1 is formed to be longer than the edge portion 352 on the lower side, in sectional view. This structure ensures that the reinforcement member 35L is conditioned to be higher in rigidity on the upper side than on the lower side. The shape of the reinforcement member 35R is equivalent to, and in left-right symmetry with, the shape of the reinforcement member 35L, and, therefore, description thereof is omitted.

The reinforcement members 35L and 35R are formed in the roughly U-shaped form in sectional view by press molding. Such a shape makes it possible to easily set the rigidity of the reinforcement members 35L and 35R to a desired value, by appropriately changing the lengths of the edge portions 351 and 352. Therefore, in the body frame 10, the use of the reinforcement members 35L and 35R roughly U-shaped in section ensures that the reinforcement members 35L and 35R with a desired rigidity can be easily produced by press molding after the lengths of the edge portions 351 and 352 are determined.

Thus, in this embodiment, a desired rigidity of the reinforcement member 35L is secured by forming the upper-side edge portion 351 to be longer than the lower-side edge portion 352 in sectional view. In the case of changing the desired rigidity according to the use of the vehicle or the like, however, a desired rigidity may be obtained by setting the upper-side edge portion 351 and the lower-side edge portion 352 to be equal in length. Alternatively, a desired rigidity may be obtained by forming the upper-side edge portion 351 to be shorter than the lower-side edge portion 352 in sectional view. In either case, the reinforcement members 35L and 35R can be produced easily.

Easier mounting of a member or members can be realized by regulating the lengths of the opposed portions of the U-shaped sectional form of the reinforcement members 35L and 35R (the edge portion 351 and the edge portion 352). Specifically, it is made possible, for example, to suitably secure an operating space at the time of mounting the spark plug 21S. More in detail, when the edge portion 352 on the lower side is made shorter, as in this embodiment, an operating space for attachment/detachment of the spark plug 21S located below the edge portion 352 or the like member is broadened, whereby it is made possible, for example, to secure the operating space required.

In the body frame 10 to which the structure according to embodiments of the invention has been applied as above described, the opening portions of the roughly U-shaped sectional forms of the reinforcement members 35L and 35R are oriented inward in the vehicle width direction. This suppresses the protrusion, toward the inner side in the vehicle width direction, of the weld parts (the beads 42L and 42R, and 43L and 43R) formed at the end portions 36L and 36R, and 38L and 38R of the reinforcement members 35L and 35R which portions are welded to the main frames 12L and 12R and the down frame 16, respectively. Consequently, a wide space can be secured on the vehicle-width-directionally inner side of each of the reinforcement members 35L and 35R. In addition, inside regions of the reinforcement members 35L and 35R can also be utilized effectively. This enables effective utilization of spaces around the reinforcement members 35L and 35R. Incidentally, for example, a harness for the inclination sensor 51 or the like may be passed through the inside regions of the reinforcement members 35L and 35R, whereby efficient utilization of space can be realized.

While embodiments of the present invention has been described above, the invention is not to be restricted to the above embodiments, and various modifications are possible without departure from the scope of the gist of the invention.

For instance, while embodiments of the present invention have been applied to a motorcycle as a saddle type vehicle in the above-described embodiment, the saddle type vehicle refers to a concept generally including vehicles designed for a rider to ride astride a vehicle body. The concept includes not only motorcycles but also three-wheel and four-wheel vehicles. Thus, the present invention is applicable not only to motorcycles but also to three-wheel and four-wheel vehicles.

In addition, while an example wherein the inclination sensor 51 as an electrical unit is disposed rearwardly of the head pipe 11 has been described in the embodiment above, other electrical unit may also be disposed in situ.

DESCRIPTION OF REFERENCE SYMBOLS

1 Motorcycle (Saddle type vehicle)
11 Head pipe
12L, 12R Main frame
16 Down frame
21S Spark plug
35L, 35R Reinforcement member
36L, 36R, 38L, 38R End portion
40L, 40R Sheet member
51 Inclination sensor (Electrical unit)
E Engine

The invention claimed is:

1. A body frame structure for a saddle vehicle, said body frame structure comprising:
   a pair of left and right main frames extending rearward from a head pipe;
   a down frame extending downward from the head pipe; and
   a pair of left and right reinforcement members each provided ranging between the main frame and the down frame,
   wherein each of the left and right reinforcement members is formed in a roughly U-shaped form in sectional view, ranges between the main frame and the down frame in a state where an opening portion of the roughly U-shaped sectional form of a reinforcement member is oriented inward in a vehicle width direction, and has its end portions welded respectively to the main frame and the down frame,
   wherein at least one end portion of the left and right reinforcement members is connected to the main frame through a sheet member, wherein the sheet member covers the main frame from outside in the vehicle width direction.

2. The body frame structure for the saddle vehicle according to claim 1,
   wherein at least one of an end portion of the left and right reinforcement members is welded to the down frame in such a manner as to cover the down frame from outside in the vehicle width direction.

3. The body frame structure for the saddle vehicle according to claim 1,
   wherein the end portion of the reinforcement member that is welded to the main frame is welded, at least partly, to a sheet member welded to the main frame.

4. The body frame structure for the saddle vehicle according to claim 1, further comprising:
   an electrical unit is supported rearwardly of the head pipe, wherein the reinforcement members are in a state of overlapping, at least partly, with the electrical unit in side view.

5. The body frame structure for the saddle vehicle according to claim 1,
   wherein an engine is disposed downwardly of the main frames,
   a spark plug is provided at a cylinder portion of the engine, and wherein
   the reinforcement members are provided upwardly of the spark plug.

6. A body frame structure for a saddle vehicle, said body frame structure comprising:
   a pair of left and right main frames extending rearward from a head pipe;
   a down frame extending downward from the head pipe; and
   a pair of left and right reinforcement members each provided ranging between the main frame and the down frame,
   wherein each of the left and right reinforcement members is formed in a roughly U-shaped form in sectional view, ranges between the main frame and the down frame in a state where an opening portion of the roughly U-shaped sectional form of a reinforcement member is oriented inward in a vehicle width direction, and has its end portions welded respectively to the main frame and the down frame, wherein the left and right reinforcement members extend forward from the main frames and are welded to the down frame,
   at least the end portion of the reinforcement member that is welded to the down frame is welded to the down frame in such a manner as to cover the down frame from outside in the vehicle width direction, and
   an extension line of the extending direction of the reinforcement member extending from the end portion of the reinforcement member that is welded to the down frame is in a state of intersecting a lower end portion of the head pipe.

7. A body frame structure for a saddle vehicle, said body frame structure comprising:
   main frame means for supporting vehicle components thereupon, said main frame means extending rearward from a head pipe means, said head pipe means for supporting steering components thereupon;
   down frame means extending downward from the head pipe means; and
   reinforcement means ranging between the main frame means and the down frame means, wherein the reinforcement means comprises first and second reinforcement means formed in a roughly U-shape in sectional view, ranging between the main frame means and the down frame means in a state where an opening portion of the roughly U-shape of one of the first and second reinforcement means is oriented inward in a vehicle width direction, and has end portions thereof welded respectively to the main frame means and the down frame means,
   wherein at least one of an end portion of the reinforcement means is connected to the main frame means through connection means, wherein the connection means include a sheet member to cover the main frame means from outside in the vehicle width direction.

8. The body frame structure for the saddle vehicle according to claim 7, wherein at least one of an end portion of the reinforcement means is welded to the down frame means in such a manner as to cover the down frame means from outside in the vehicle width direction.

9. The body frame structure for the saddle vehicle according to claim 7, wherein the end portion of the first or second reinforcement means that is welded to the main frame means is welded, at least partly, to a sheet member welded to the main frame means.

10. The body frame structure for the saddle vehicle according to claim 7, further comprising:
    electrical means for supporting electrical components therein, supported rearwardly of the head pipe means, wherein the reinforcement means are in a state of overlapping, at least partly, with the electrical means in side view.

11. The body frame structure for the saddle vehicle according to claim 7, wherein engine means for providing motive power is disposed downwardly of the main frame means, wherein spark plug means for providing spark is provided at a cylinder portion of the engine means, and wherein the reinforcement means is provided upwardly of the spark plug means.

12. A body frame structure for a saddle vehicle, said body frame structure comprising:
    main frame means for supporting vehicle components thereupon, said main frame means extending rearward from a head pipe means, said head pipe means for supporting steering components thereupon;
    down frame means extending downward from the head pipe means; and
    reinforcement means ranging between the main frame means and the down frame means, wherein the reinforcement means comprises first and second reinforcement means formed in a roughly U-shape in sectional view, ranging between the main frame means and the down frame means in a state where an opening portion of the roughly U-shape of one of the first and second reinforcement means is oriented inward in a vehicle width direction, and has end portions thereof welded respectively to the main frame means and the down frame means, wherein at least one of an end portion of the reinforcement means is welded to the main frame means in such a manner as to cover the main frame means from outside in the vehicle width direction, wherein the reinforcement means extend forward from the main frame means and are welded to the down frame means, wherein at least the end portion of the one of the first and second reinforcement means that is welded to the down frame means is welded to the down frame means in such a manner as to cover the down frame means from outside in the vehicle width direction, and wherein an extension line of the extending direction of the first or second reinforcement means extending from the end portion of the one of the first or second reinforcement means that is welded to the down frame means is in a state of intersecting a lower end portion of the head pipe.

* * * * *